United States Patent [19]
Hargrove

[11] Patent Number: 5,787,417
[45] Date of Patent: Jul. 28, 1998

[54] METHOD AND SYSTEM FOR SELECTION OF HIERARCHICALLY RELATED INFORMATION USING A CONTENT-VARIABLE LIST

[75] Inventor: Richard R. Hargrove, Redmond, Wash.

[73] Assignee: Microsoft Corporation, Redmond, Wash.

[21] Appl. No.: 10,540

[22] Filed: Jan. 28, 1993

[51] Int. Cl.⁶ ................................................ G06F 17/30
[52] U.S. Cl. ........................ 707/4; 345/353; 345/357
[58] Field of Search .................. 364/DIG. 1, DIG. 2; 395/600, 160; 345/115, 116, 118, 339, 340, 352, 353, 356, 357, 434, 433, 902, 968; 707/4

[56] References Cited

U.S. PATENT DOCUMENTS

| | | | |
|---|---|---|---|
| 4,422,158 | 12/1983 | Galie | 364/900 |
| 4,754,326 | 6/1988 | Kram et al. | 364/900 |
| 4,879,648 | 11/1989 | Cochran et al. | 364/300 |
| 4,972,349 | 11/1990 | Kleinberger | 364/900 |
| 5,041,967 | 8/1991 | Ephrath et al. | 345/352 |
| 5,065,347 | 11/1991 | Pajak et al. | 395/159 |
| 5,226,117 | 7/1993 | Miklos | 345/356 |
| 5,241,671 | 8/1993 | Reed et al. | 395/600 |
| 5,287,448 | 2/1994 | Nicol et al. | 395/159 |
| 5,297,253 | 3/1994 | Meisel | 345/357 |
| 5,321,609 | 6/1994 | Yianilos et al. | 364/419.13 |
| 5,339,433 | 8/1994 | Frid-Nielsen | 395/700 |
| 5,347,623 | 9/1994 | Takano et al. | 395/157 |
| 5,388,251 | 2/1995 | Makino et al. | 395/575 |
| 5,485,175 | 1/1996 | Suzuki | 345/353 |

OTHER PUBLICATIONS

Cowart, Robert, "mastering Windows 3.1, Special Edition," SYBEX, USA, 1993, pp. 101–145.
*Microsoft Windows & MS–DOS 6 User's Guide*, Microsoft Corporation, United States of America, 1993, pp. iii–xvi and pp. 58–69.

*Primary Examiner*—Paul R. Lintz
*Assistant Examiner*—Maria N. Von Buhr
*Attorney, Agent, or Firm*—Seed and Berry LLP

[57] ABSTRACT

A method and system for selection of hierarchically related information. Initially, topics are displayed in the content variable list which encompass a first set of information. Upon receiving input from the user, new topics appropriate to the user input are displayed in the content variable list which encompass a second set of information hierarchically related to the first set of information. A selected topic is then obtained from the user from among the new topics displayed. Information is then obtained which is encompassed by the selected topic. In a preferred embodiment, this information is obtained by performing a database query using the selected topic as a query topic.

23 Claims, 20 Drawing Sheets

METHOD AND SYSTEM FOR SELECTION OF HIERARCHICALLY RELATED INFORMATION USING A CONTENT-VARIABLE LIST

TECHNICAL FIELD

The present invention relates to the field of database systems and, more particularly, to a method and system for selection of hierarchically related information using a content-variable list.

BACKGROUND OF THE INVENTION

A typical computer-implemented database system provides storage and retrieval of hierarchically related information. For example, such hierarchically related information may be organized in the form of a tree. A tree is a well known data structure for organizing data hierarchically. Such a tree has nodes which are parent and child nodes corresponding to topics and subtopics that encompass the hierarchically related information. The tree has, at the topmost level, a root node which is a parent of all nodes below. The tree also has, at the lowest levels, leaf nodes which have no child nodes but which reference the hierarchically related information itself.

In a typical database system, a user may wish to retrieve information of a desired topical scope. Conventional database systems have provided this capability to the user in the form of a database query in which the user specifies a query topic corresponding to a desired hierarchical level of information to retrieve. For example, the user requests information referenced by a relevant leaf node by requesting topics which correspond to a specific node at a desired hierarchical level in the tree structure. In early database systems, such a database query had to be specified by the user in the form of a textual request listing the query topic in a specific syntax. As this syntax was difficult for users to remember and, consequently, awkward and error-prone, its use was of limited value.

More recent database systems have improved the usability of the database query by providing topic lists from which the query topic can be selected. Instead of requiring the user to remember a specific syntax, the topic lists are displayed so that the user can simply select a query topic from an appropriate topic list. The topic lists are displayed on a computer screen, each listing topics from which the user can select a query topic. Upon selecting the query topic, the user requests a database query having the selected query topic as a parameter.

A current Executive Information System (EIS) is an example of such a database system. An EIS is a database system used by executives and managers to obtain information on an organization and its products. In such a system, topic lists are displayed on a computer screen. A user can select from the topic lists a topic to be addressed in a report. For example, a sales report on a certain class of products can be requested. Upon selection of the topic, a database query is generated having the selected topic as a query topic. The report is then printed or displayed on the computer screen based on information returned by the database query.

In a database system which utilizes such topic lists, the content of each topic list is fixed. In order to display topic lists of different topics, the entire screen layout must be designed so that the different areas of the screen are assigned to the different topic lists. Thus, to display topics of different hierarchical levels may require many different topic lists displayed on many different parts of the computer screen.

A simple example of such a screen layout is shown in FIG. 1. In FIG. 1, the screen layout is designed so that a user can request a sales report regarding a variety of products or classes of products chosen from separately displayed list boxes, each containing a different topic list. The "products" list box 101 contains "copiers", "software" and "paper" as subtopics of the products topic. Each of these products subtopics is a topic itself which has its own separately displayed list box: a "copiers" list box 110, a "software" list box 120 and a "paper" list box 130. In turn, the "copier" subtopics are topics which have their own separately displayed list boxes: a "personal copiers" list box 111, a "department copiers" list box 112 and a "company copiers" list box 113, and the "software" subtopics are topics which have their own separately displayed list boxes: a "LAN Software" list box 121 and an "Image Software" list box 122. If the user desires a report on software sales in general, the user would select "Software" from the products list box 101. If the user desires, instead, a sales report on only LAN software, the user would select "LAN Software" from the separately displayed software list 120 box, and so on.

Although an improvement over earlier, syntax-specific systems, a number of disadvantages exist in current topic list-based database systems such as the EIS shown in FIG. 1. As shown in FIG. 1, at least one differently located topic list is separately displayed for each different hierarchical level of information that can be requested by the user. As the number of hierarchical levels increases, the number of separately displayed topic lists must also increase. For example, each topic in the products list box 101 has its own topic list, increasing the number of topic lists from 1 to 4. The topics in the copiers list box 110 and the software list box 120 each have their own topic lists, increasing the number of topic lists from 4 to 9. As a result, a finite limitation exists, based on available screen space, as to the number of topics selectable from a single screen. Accordingly, a corresponding limitation exists as to the number of potential query topics. Consequently, the amount of information which can be provided by a database query is limited.

Another consequence of providing differently located fixed content lists for each different topic is that the user is allowed to select topics which may conflict with each other. That is, topics might be selected which are not hierarchically related. For example, a user might select "Copiers" and "Computer" from the screen shown in FIG. 1. "Computer", however, is a subtopic of "Paper", not "Copiers", so the selected combination of topics cannot be utilized.

This problem is worsened by the fact that the hierarchical relationship among the topics in the different lists is not always readily apparent. This is because limitations of screen space may dictate that topic lists of hierarchically related topics and subtopics cannot always be grouped in a manner consistent with their hierarchical relationship. As shown in FIG. 1, for example, to avoid segregation of different list boxes which display related topics, the list boxes corresponding to the topics in the products list box 101 are not provided in the order in which the topics appear in the list box 101. Often, the location of the different list boxes must be carefully chosen to provide hierarchically related topics in reasonable proximity. In some cases, such proximity is impossible.

Another serious disadvantage of existing topic list-based database systems is that, because the content of the lists is fixed, the screen layout must be initially designed on the assumption that a specific set of topics will be displayed on the computer screen. Thereafter, any modification to the topic lists, such as adding new topic lists or adding new topics to a topic list, necessitates that the screen layout must be altered. Not only is such a modification time-consuming, but it may also lead to inconsistency among remotely-distributed users of the system who may not have a modified screen layout to correspond to the new topics they wish to reference.

SUMMARY OF THE INVENTION

An object of the present invention is to provide user selection of hierarchically related information from an unlimited number and variety of database topics.

Another object of the present invention is to provide user selection of hierarchically related information from a single display screen.

Yet another object of the present invention is to provide user selection of information which is necessarily hierarchically related.

Still another object of the present invention is to provide to a user a content variable list having selectable topics which can change.

These and other objects are obtained by a method and system for selection of hierarchically related information using a content variable list. The content variable list is a single, consistently displayed topic list having selectable topics that can change. Initially, topics which encompass a first set of information are displayed in the content variable list. Upon receiving input from the user, new topics appropriate to the user input are displayed in the content variable list which encompass a second set of information hierarchically related to the first set of information. A selected topic is obtained from the user from among the new topics displayed. Information is then obtained which is encompassed by the selected topic. In a preferred embodiment, this information is obtained by performing a database query using the selected topic as a query topic.

DETAILED DESCRIPTION OF THE INVENTION

Figure 1:
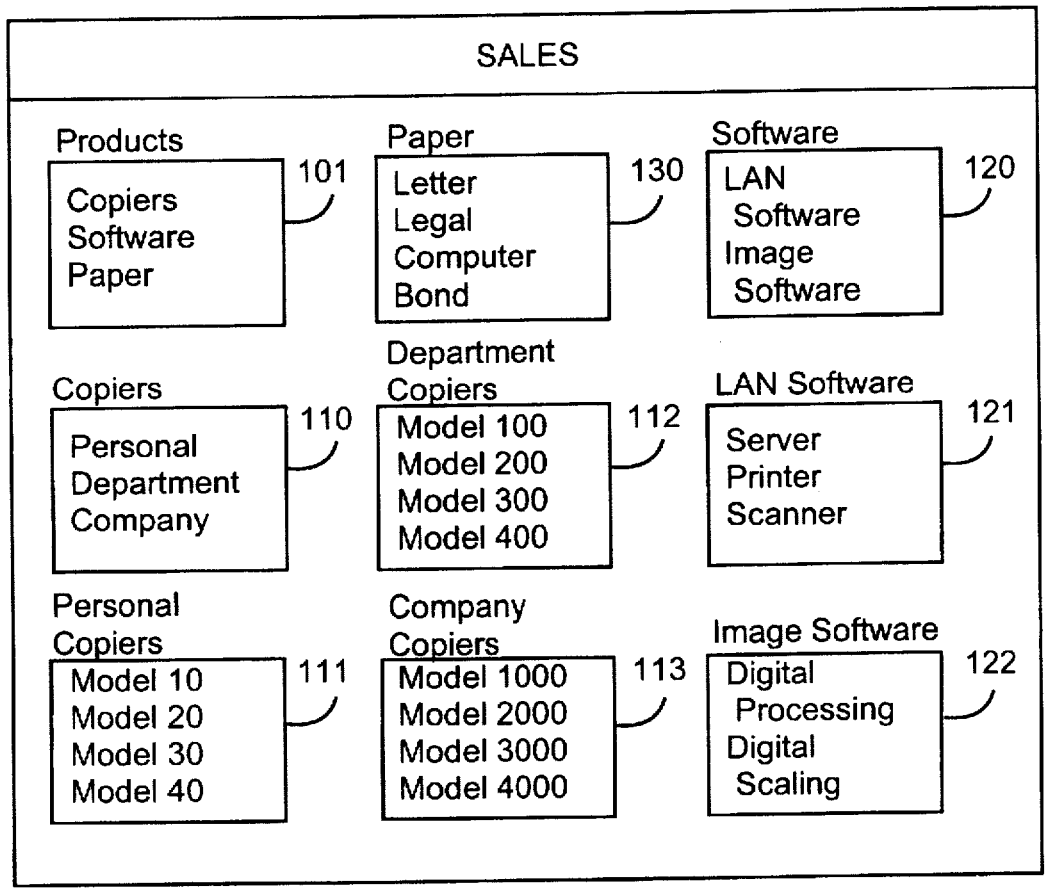
FIG. 1 is an example prior art screen layout for a topic list-based database system.

The present invention provides "a content variable list" which is a single, consistently displayed topic list having selectable, hierarchically related topics that can change. The content variable list displays a set of topics to a user. The invention then obtains from the user an indication of an action to take with regard to the displayed topics and then performs this action. For example, the invention obtains a request to "broaden" or "narrow" the topics displayed and then broadens or narrows the topics accordingly, as will be explained. Or, the invention obtains a selected topic from among the displayed topics and then takes appropriate action to obtain information encompassed by the selected topic. The invention obtains this information by, for example, performing a database query having the selected topic as a parameter.

To "narrow" the displayed topics, the invention obtains from the user an initially selected topic from among the displayed topics in the content variable list. Subtopics of the selected topic are then displayed as new topics in the content variable list so that the selected topic can be selected by the user from among the newly displayed topics. In a preferred embodiment of the invention, the topics are organized as a tree data structure that can be traversed by the user through manipulation of the content variable list. Upon a user choice of a displayed topic, the tree structure is traversed downward to obtain the subtopics (children of the chosen topic). The subtopics are then displayed as new topics in the content variable list.

The present invention also allows the user to "broaden" the topics in the content-variable list. Upon a request by the user, the invention displays "higher level topics" which encompass the topics currently displayed in the content-variable list. The "higher level topics" are topics of an immediately higher hierarchical level than those currently displayed in the content-variable list.

They are, for example, represented in a tree structure by a parent node of all of the nodes which represent the currently displayed topics, and by the siblings of that parent node. These higher level topics replace the topics currently displayed in the content-variable list. In the preferred embodiment having the tree structure discussed above, the tree structure is traversed upward and the higher level topics (comprising a parent of the currently displayed topics and its siblings) are displayed as new topics.

At any time, the user can request information encompassed by a currently selected topic. Upon receiving this request, the invention obtains information encompassed by the most recently selected topic in the content-variable list. In a preferred embodiment, the present invention comprises a database system and performs a database query having the selected topic as a "query topic." The "query topic" is a topic which is a parameter in the database query and defines a set of information in the database system to be retrieved therefrom. As a result, the user is able to quickly and intuitively define the topical scope of the database query while having to use only the single content variable list.

In a particularly preferred embodiment, multiple query topics can be selected by the above-described method. Multiple "query dimensions" are provided, each query dimension corresponding to one of the multiple query topics in the database query. For each query dimension, the user can select a query topic which is encompassed by the query dimension. In the preferred embodiment having the tree structure discussed above, each query dimension is a root node of its own tree structure, and each corresponding query topic corresponds to a node in that tree structure.

In a preferred embodiment, a dimension box is displayed from which the user can select the query dimension. A selection box is displayed (as the single content variable list) from which the query topic for each query dimension is selected from among the displayed topics. Also, a navigation box is optionally displayed which contains the higher level topics of the topics currently displayed in the selection box. The navigation box is also a content-variable list whose higher level topics can change by selecting from the selection box a query topic for each query dimension (optionally using the displayed higher level topics for navigation), the user defines the topical scope of each multiple topic database query.

Figure 2:
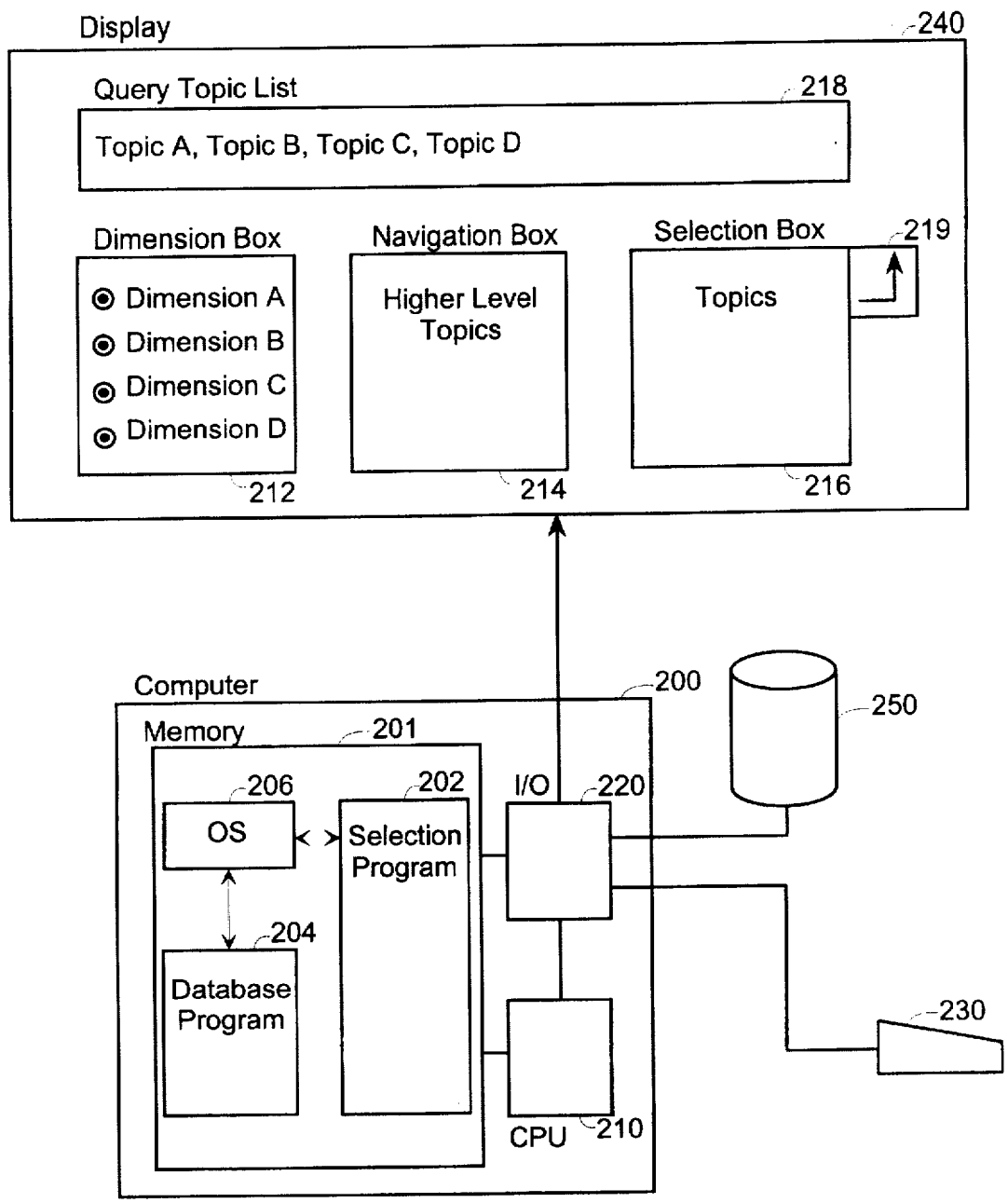
FIG. 2 is a block diagram of the preferred system of the present invention.

FIG. 2 is a block diagram of the preferred system of the present invention. A computer 200 is provided which has a memory 201, a CPU 210 and an I/O unit 220. The memory 201 stores a selection program 202, database program 204, and operating system 206. The selection program 202 is executed by the CPU 210 to obtain input from the user via the I/O unit 220 and entered by the user with a keyboard 230, a mouse, or any other input device, based on information displayed on a display 240. Based on this input, provides a database query to the database program 204. In response to the database query, the database program obtains information from a database 250 which is stored, for example, on disk. One of ordinary skill in the art will recognize that many available database programs can be implemented to perform these functions. One such database program is Microsoft Excel, by Microsoft Corporation.

The display 240 displays a dimension box 212, navigation box 214, selection box 216, query topic list 218 and arrow box 219. The dimension box 212 contains query dimensions selectable by the user, each of which corresponds to a different set of topics from which the user can select a query topic for the database query. The selection box 216 contains a content variable list of topics from which the user selects a query topic encompassed by the currently selected dimension. The navigation box 214 displays higher level topics of the currently displayed topics in the selection box. The navigation box is used as a navigation aid by the user to view the higher level topics while selecting a topic from the selection box. The arrow box 219 is used by the user to request higher level topics than those currently displayed. The query topic list 218 lists the currently selected query topics for each dimension.

Figure 3:
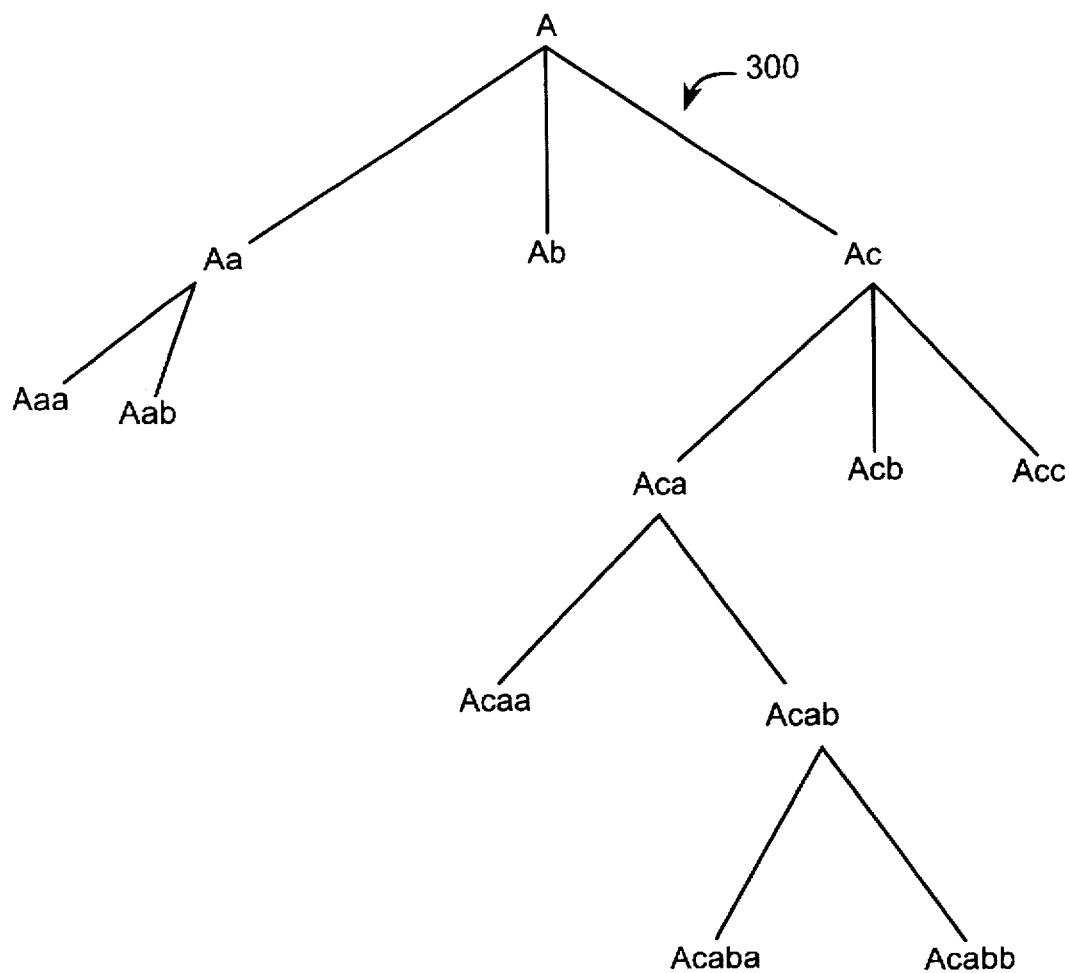
FIG. 3 illustrates a tree data structure into which the hierarchically related information stored in the database 208 is organized.

An example of user selection of a query topic is explained with reference to FIGS. 3, 4 and 5. FIG. 3 illustrates a tree data structure 300 into which the hierarchically related information stored in the database 250 is organized. In the tree data structure, information topics and subtopics thereof are organized into parent and child nodes, respectively. In such a tree data structure, as is well known, a root node is provided at the highest level. All other nodes except the lowest level nodes are parent nodes having child nodes. Nodes sharing a same parent node are siblings. The parent nodes contain a reference such as a pointer, to the child nodes. The child nodes may themselves be parent nodes having child nodes. The lowest level nodes in the tree structure, however, are leaf nodes which have no child nodes. In the tree data structure shown in FIG. 3, these leaf nodes, which represent topics that have no subtopics, contain a reference to the information itself.

The tree data structure 300 corresponds to dimension A from the dimension box 212 displayed by the display 240. The root node A has as children nodes Aa, Ab and Ac. Node Aa has as its own children nodes Aaa and Aab, and so on. Upon user selection of dimension A from the dimension box, for example, the selection program 202 causes the highest level topics in the database tree, topics Aa, Ab and Ac, to be displayed in the navigation box 214. Upon user selection of a topic Aa, Ab or Ac from the navigation box 214, the selection program 202 causes the subtopics of the selected topic to be displayed as topics in the selection box 216. For example, upon selection of Ac from the navigation box 214, Aca, Acb and Acc would be displayed as topics in the selection box 216.

Figure 4:
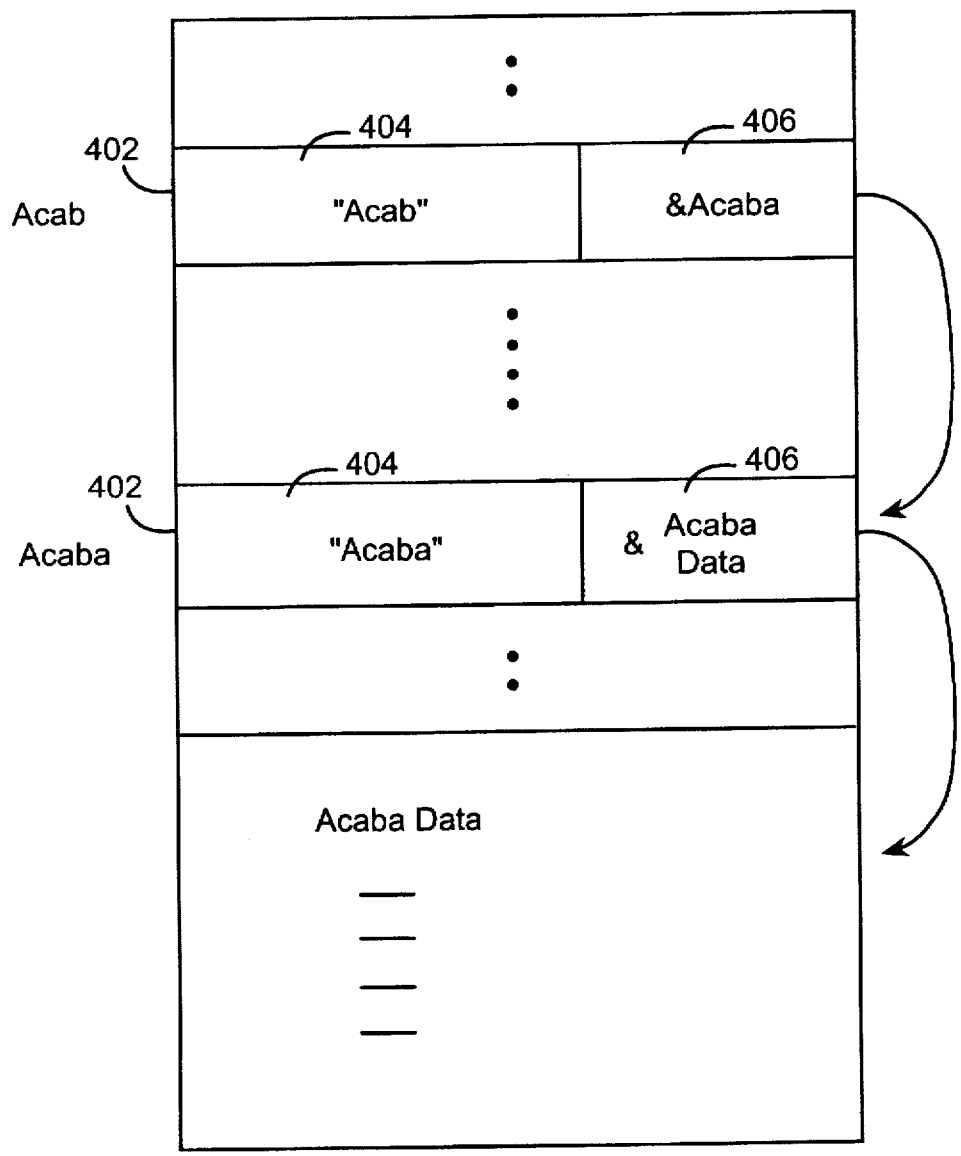
FIG. 4 illustrates an implementation of the tree data structure 300 into the database 208.

FIG. 4 illustrates an example implementation of the tree data structure 300 by the database program 204. In FIG. 4, an illustrative portion of the database 250 is shown as maintained by the database program 204. This portion of the database 250 is organized into a series of nodes 402, each of which represents a node in the tree data structure 300. Each node 402 stores a topic name 404 and a pointer 406 to another node or to the information encompassed by the topic. For example, the "Acab" node, which represents the topic Acab, points to the "Acaba" node, which represents, as a subtopic of the topic Acab, the topic Acaba. The "Acaba" node, representing a topic which has no subtopics, points to the Acaba data.

Figure 5A:
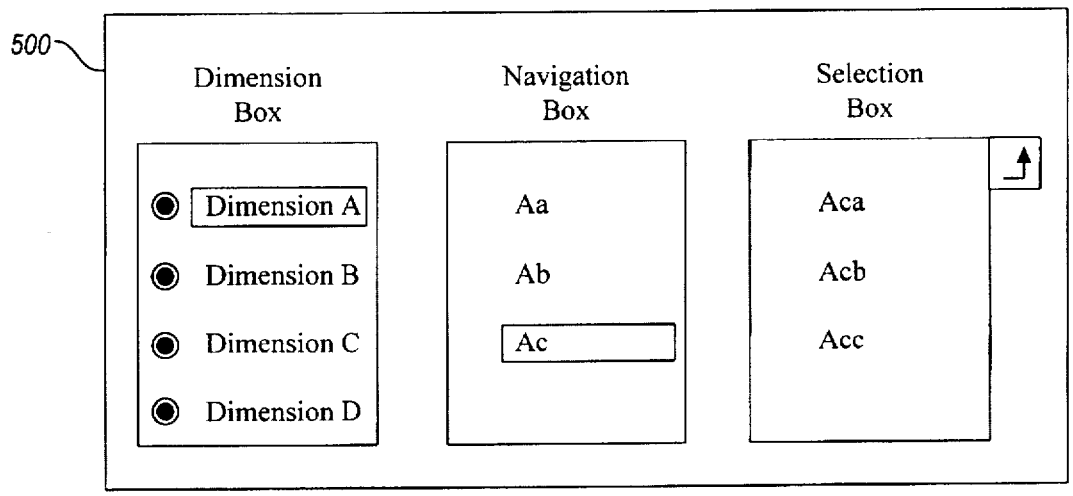
FIG. 5 illustrates example display screens obtained when traversing the tree data structure 300.
Figure 5B:
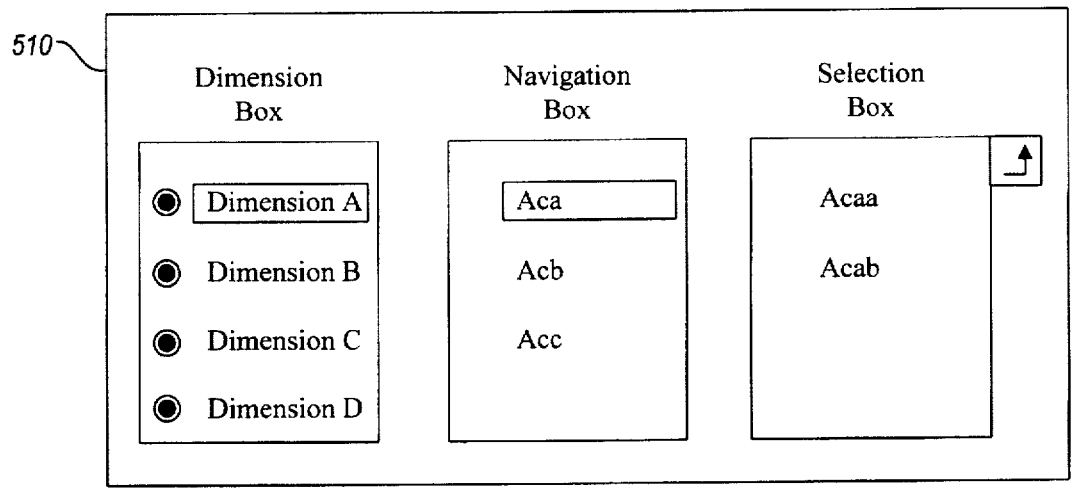
Figure 5C:
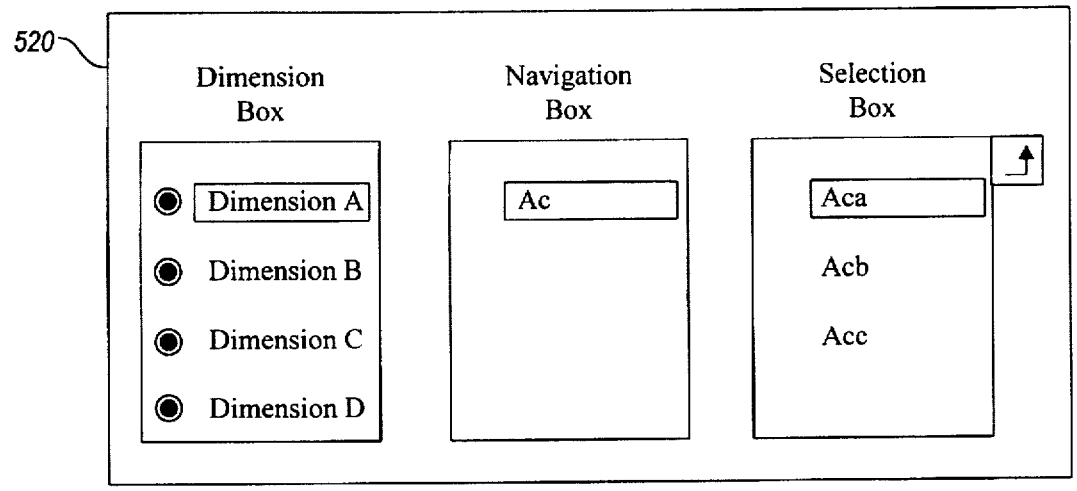

FIG. 5 illustrates example display screens obtained when traversing the tree data structure 300. Specifically, FIG. 5 shows the contents of the dimension box 212, navigation box 214 and selection box 216, when the tree data structure 300 is traversed in accordance with user selection of various topics therein. Initially, a relevant portion of the display screen appears as shown in the example screen 500. As a result of previous user selection of dimension A, the selection program displays Aa, Ab and Ac in the navigation box as higher level topics. Upon a user choice of the higher level topic Ac, the selection program traverses the tree data structure downward to obtain the children Aca, Acb and Acc of the higher level topic Ac, and displays Aca, Acb and Acc as topics in the selection box 216.

Upon a user request to display the subtopics of the topic Aca displayed in the selection box 216, the selection program updates the computer screen to appear as shown in example screen 510. The selection program displays Aca, along with its siblings Acb and Acc, as higher level topics in the navigation box 214. The selection program traverses the tree data structure 300 further downward to obtain the children Acaa and Acab of Aca. The selection program displays Acaa and Acab as topics in the selection box 216.

Similarly, upon a user request to display higher level topics than the currently displayed topics, the selection program updates the computer screen to appear as shown in example screen 520. The selection program 202 displays in the selection box 216 the higher level topic Aca along with its siblings Acb and Acc. The selection program traverses the tree data structure upward to obtain the parent Ac of displays Ac in the navigation box 214 as the parent of these topics.

Figure 6:
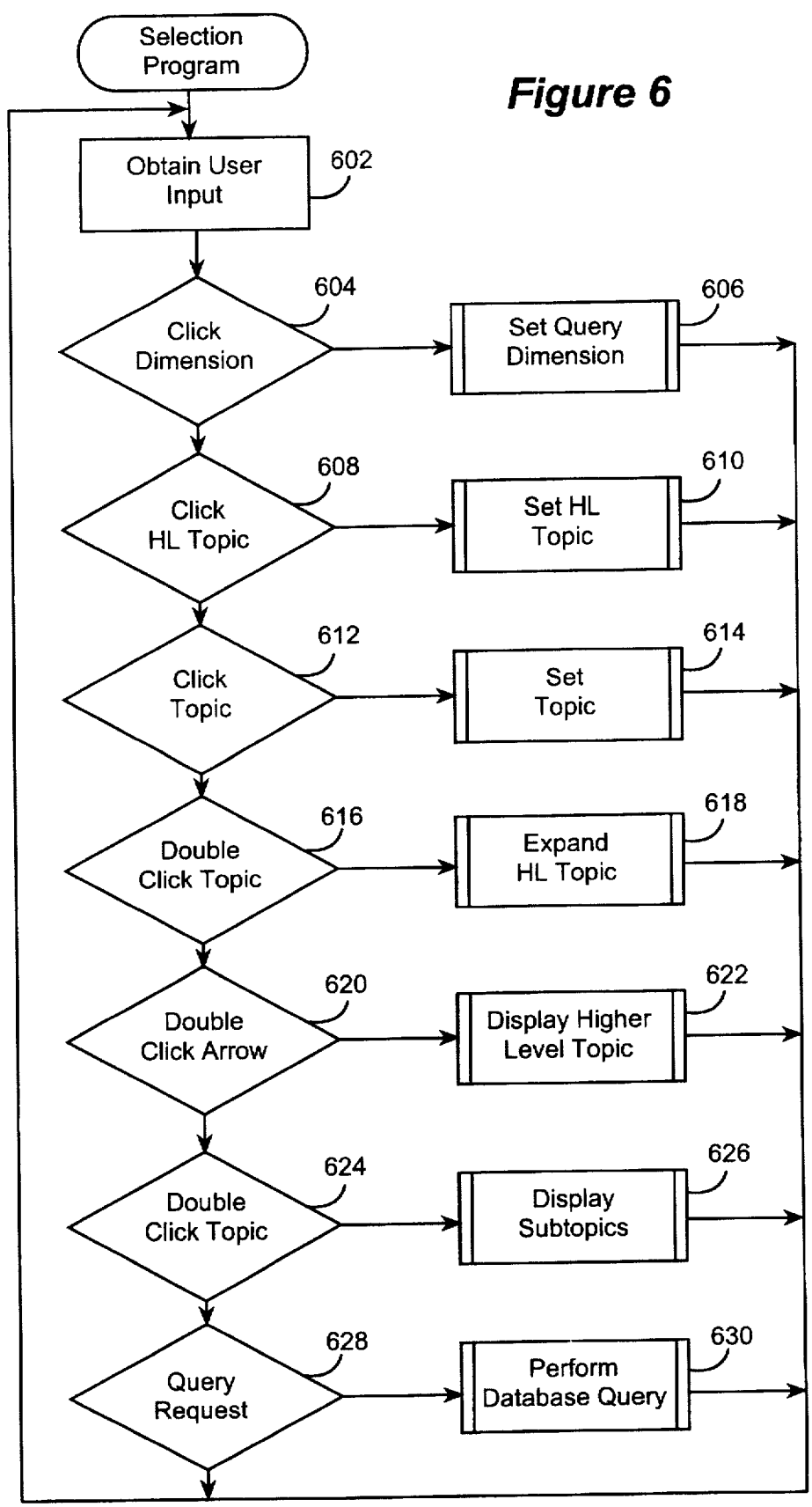
FIG. 6 is a flow diagram of the selection program which performs the preferred method.

FIG. 6 is a flow diagram of the selection program which performs the preferred method. The selection program repetitively obtains user input and performs routines appropriate to the user input to provide the user with various options in defining topics to be selected as query topics for a database query. Specifically, based on the user input, the selection program sets a query dimension, sets a higher level topic, sets a topic, expands a higher level topic, displays a higher level topic, displays a subtopic of a topic, or performs a database query based on a currently selected topic. Each of these operations is explained below.

In step 602, the selection program obtains user input from the user via a mouse. As is well known in the computer field, a mouse is used to indicate an item displayed on the display screen by positioning a cursor on the display screen. The mouse is used to designate an action to be taken with regard to that item by "clicking on" or "double clicking on" the displayed item. Also, as is well known, a mouse is "clicked" by a single depression and release of a button provided thereon, and "double clicked" by two rapidly successive depressions and releases of the button within a predesignated time period.

The selection program allows the user to select a query dimension by single clicking on a query dimension displayed in the dimension box 212. In step 604, if the user input is a single click on a displayed query dimension in the dimension box 212, control branches to step 606, where the Set Query Dimension routine is called. Otherwise, control proceeds to step 608.

The selection program also allows the user to select a higher level topic displayed in the navigation box 214. In step 608, if the user input is a single click on a higher level topic displayed in the navigation box 214, then control branches to step 610, where the Set Higher Level Topic routine is called. Otherwise, control proceeds to step 612.

The selection program additionally allows the user to select a topic displayed in the selection box 216. In step 612, if the user input is a single click on a topic displayed in the selection box 216, the control proceeds to step 614 where the Set Topic routine is called. Otherwise, control proceeds to step 616.

The selection program allows the user to expand a higher level topic by viewing the topics which are children of the higher level topic under the higher level topic in the navigation box 214. In step 616, if the user input is a double click on a higher level topic, then control proceeds to step 618 where the routine Expand Higher Level Topic is called. Otherwise, control proceeds to step 620.

The selection program also allows the user to broaden the scope of displayed topics by choosing higher level topics to be displayed in the selection box. A higher level topic is a topic of a hierarchically higher level than the topics currently displayed in the selection box. The parent of the topics currently displayed in the navigation box 214, and its siblings, are newly displayed as higher level topics in the navigation box 214. The previous higher level topics are then newly displayed as topics in the selection box 216. In step 620, if the user input is a double click on the currently selected higher level topic or arrow 219, the routine Display Higher Level Topics is called. Otherwise, control proceeds to step 614.

The selection program allows the user to narrow the scope of the displayed topics, as well. When the user chooses a topic displayed in the selection box 216, the subtopics of the chosen topic are displayed as topics in the selection box 216, and the chosen topic and its siblings are displayed as new higher level topics in the navigation box 214. If, in step 624, the user input is a double click on a topic, then control proceeds to step 626, where the routine Display Subtopics is called. Otherwise, control proceeds to step 628.

Finally, the selection program allows the user to request a database query. The selection program performs a database query in accordance with this request, using the currently recorded query topic in the query topic list 218. This currently recorded query topic represents the most recently selected topic from the selection box 216 for the currently selected query dimension. In step 628, if the user input is a database query request, then the selection program performs a database query in step 630. For example, the selection program provides an appropriate Microsoft Excel command. One having ordinary skill in the art will recognize how to structure the database query based on any given database. The topics selected by the user for each query dimension become query topics in the database query. After steps 606, 610, 614, 618, 622, 626, 628 or 630 are performed, the selection programs loops back to repeat step 602. This loop is performed repetitively so that input from the user is continually obtained. Alternatively, in a computer system which supports asynchronous input/output, the user input could be obtained at any time via an interrupt.

Figure 7:
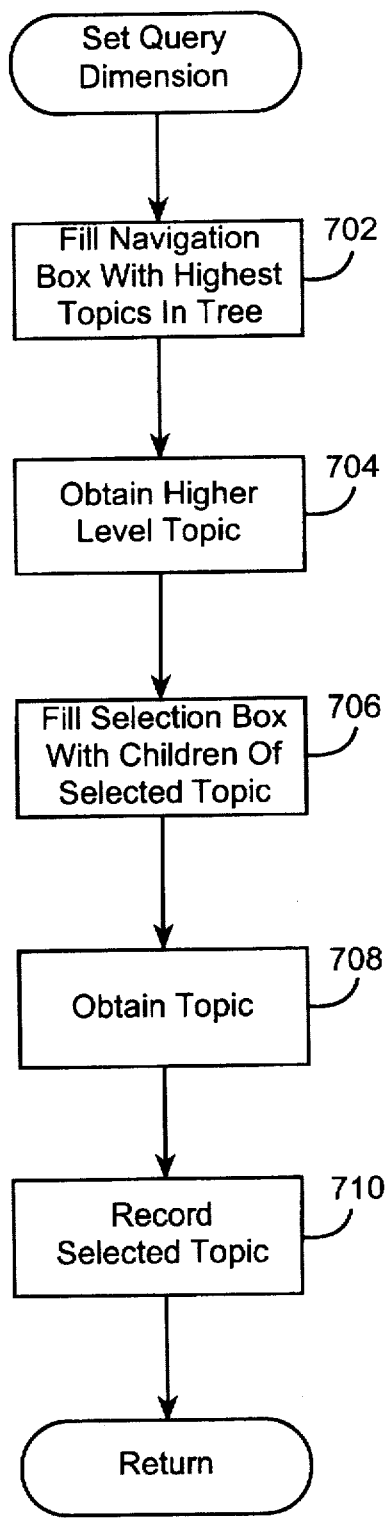
FIG. 7 is a flow diagram of the set query dimension routine.

FIG. 7 is a flow diagram of the Set Query Dimension routine. The Set Query Dimension routine sets a query dimension selected in the dimension box. The routine also displays higher level topics in the navigation box which are encompassed by the selected query dimension, and displays topics in the selection box which are encompassed by these higher level topics. The selection program calls the select dimension routine when the user selects a query dimension from the dimension box 212.

In step 702, the routine displays in the navigation box 214 the highest level topics from the tree data structure corresponding to the selected query dimension. In step 704, the routine obtains a higher level topic upon user selection of the higher level topic from the navigation box 214. In step 706, the routine displays in the selection box 216 the subtopics of the higher level topic selected from the navigation box 214 in step 704. In step 708, the routine obtains a selected topic from the user from among the displayed topics in the selection box 216. If the user does not select a topic, a default topic is not selected. In step 710, the routine records the selected topic in memory as a query topic to be a parameter in a subsequent database query. Then the routine displays the selected topic in the query topic list 218 as a query topic corresponding to the selected dimension. The routine then returns to the selection program.

In a particularly preferred embodiment, the dimension box 212 contains as query dimensions a subject dimension, perspective dimension, market dimension, time dimension and unit dimension. The subject dimension defines a set of topics falling under a subject category, such as "Products" or "Finance." The perspective dimension defines a set of topics falling under a perspective category, such as, "Net Sales" or "Planned Sales." The market dimension defines a set of topics within a certain market, such as "Southeastern U.S." The time dimension defines a set of topics bounding the information therein to a certain time period, such as "First Quarter, 1992." The unit dimension defines the units of measurement by which the information is returned from the database query.

Figure 8:
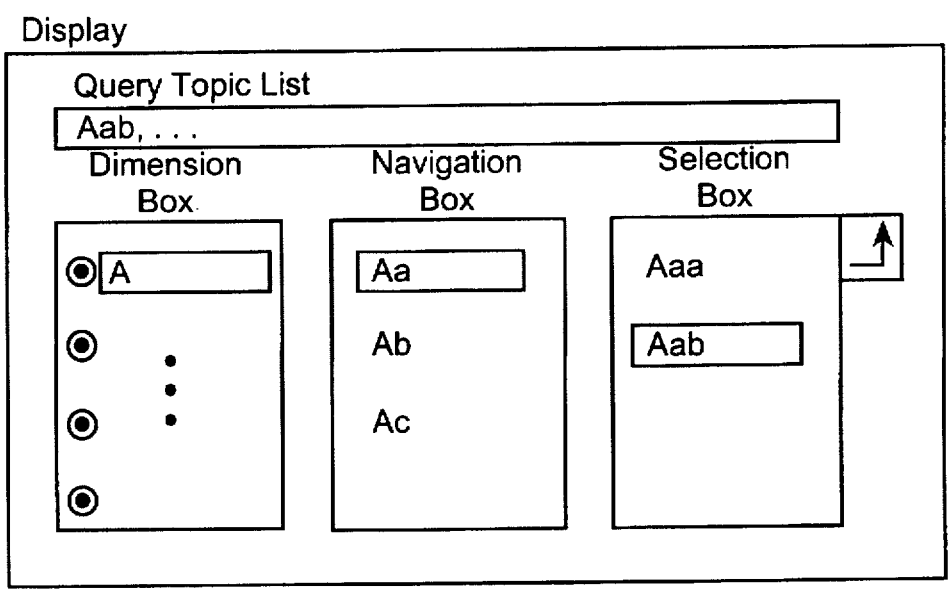
FIG. 8 illustrates an example computer screen displayed by the set query dimension routine based on the example tree structure from FIG. 3.

FIG. 8 illustrates an example display screen displayed by the Set Query Dimension routine based on the example tree structure from FIG. 3. In FIG. 8, upon user selection of query dimension A from the dimension box, the set query dimension routine displays the highest level topics Aa, Ab and Ac in the navigation box. Upon user selection of the higher level topic Aa from the navigation box, the set query dimension routine displays the subtopics Aaa and Aab in the selection box. Upon user selection of the topic Aab from the selection box, the set query dimension routine records and displays the topic Aab as a query topic in the query topic list, as shown.

Figure 9:
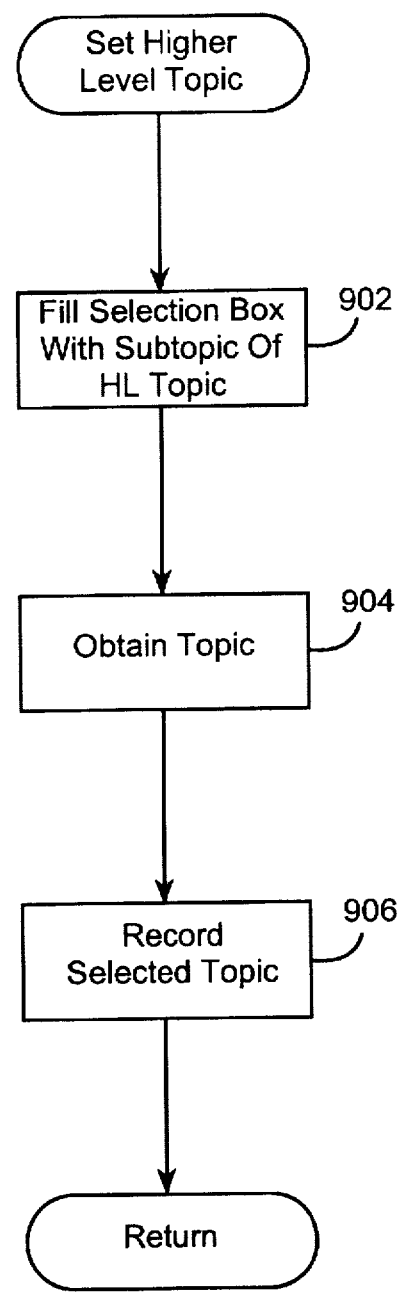
FIG. 9 is a flow diagram of the set higher level topic routine.

FIG. 9 is a flow diagram of the Set Higher Level Topic routine. The Set Higher Level Topic routine sets a new higher level topic upon user selection of the higher level topic from the navigation box 214, and displays topics in the selection box 216 which are subtopics of the higher level topic selected. The set higher level topic routine is called by the selection program upon receiving from the user a single click on a higher level topic displayed in the navigation box 214. In step 902, the routine displays the subtopics of the selected higher level topic in the selection box 216. In step 904, the routine obtains a selected topic from the user from among the displayed topics in the selection box 216. If the user does not select a topic, a default topic is selected. In step 906, the routine records and displays the selected topic as a query topic in the query topic list 218. The routine then returns to the selection program.

Figure 10A:
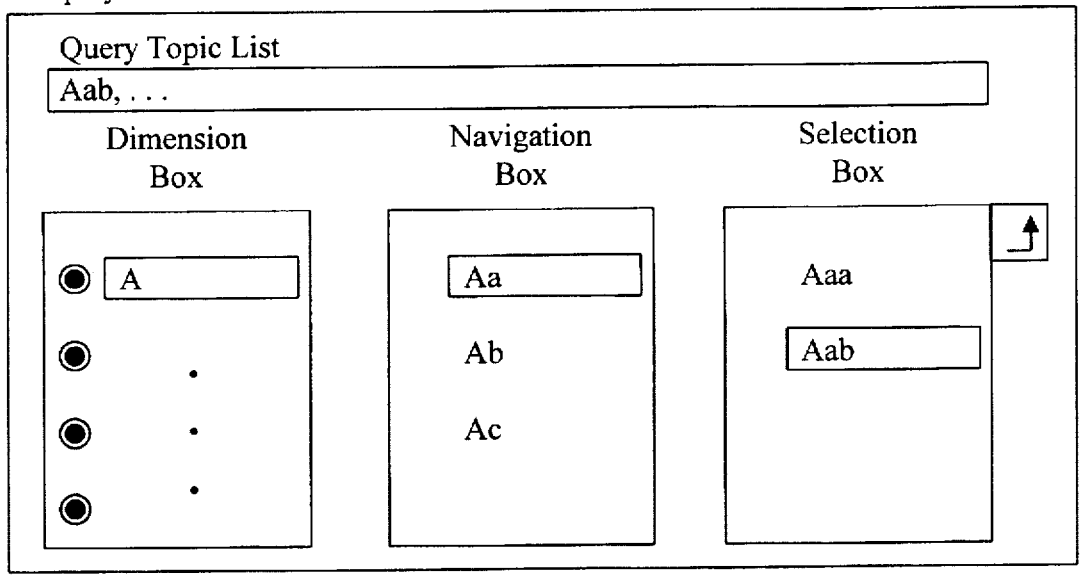
FIG. 10 illustrates example display screens displayed by the set higher level topic routine.
Figure 10B:
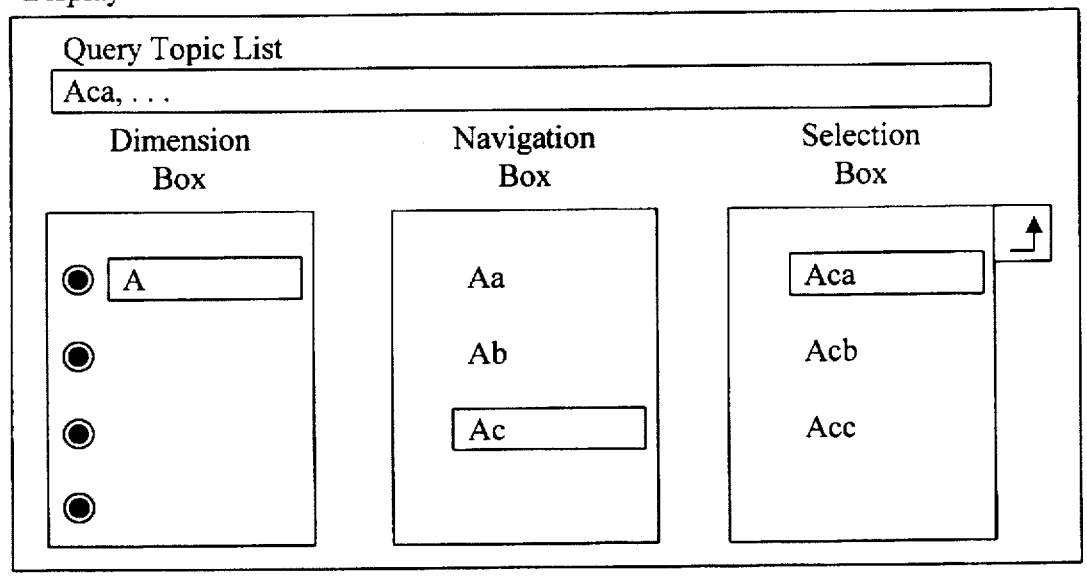

FIG. 10 illustrates example display screens displayed by the Set Higher Level Topic routine. In FIG. 10, query dimension A is initially displayed in the dimension box 212 as the currently selected query dimension, higher level topic Aa is initially displayed in the navigation box 214, and topic Aab is initially displayed as the currently selected topic in the selection box 216 and is thus displayed as a query topic in the query topic list 1018. Upon user selection of a new higher level topic Ac from the navigation box 214, the set higher level topic routine displays the selected higher level topic Ac in the navigation box 214 and obtains from the user a selection of a new topic Aca from the selection box 216. As a result, the query topic list is updated to display the newly selected topic Aca as a query topic.

Figure 11:
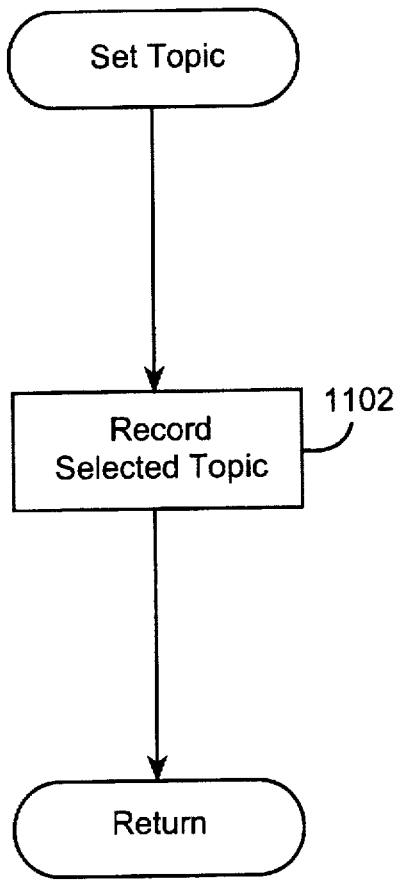
FIG. 11 is a flow diagram of the set new topic routine.

FIG. 11 is a flow diagram of the Set Topic routine. The Set Topic routine sets a new topic in the query topic list upon user selection of the topic from the selection box 216. The select new topic routine is called by the selection program upon receiving from the user a single click on a topic displayed in the selection box 216. In step 1102, the routine records the newly selected topic in memory as a query topic to be a parameter in a subsequent database query. The routine then adds the newly selected query topic to the query topic list 218 and displays the updated query topic list 218. The routine then returns to the selection program.

Figure 12A:
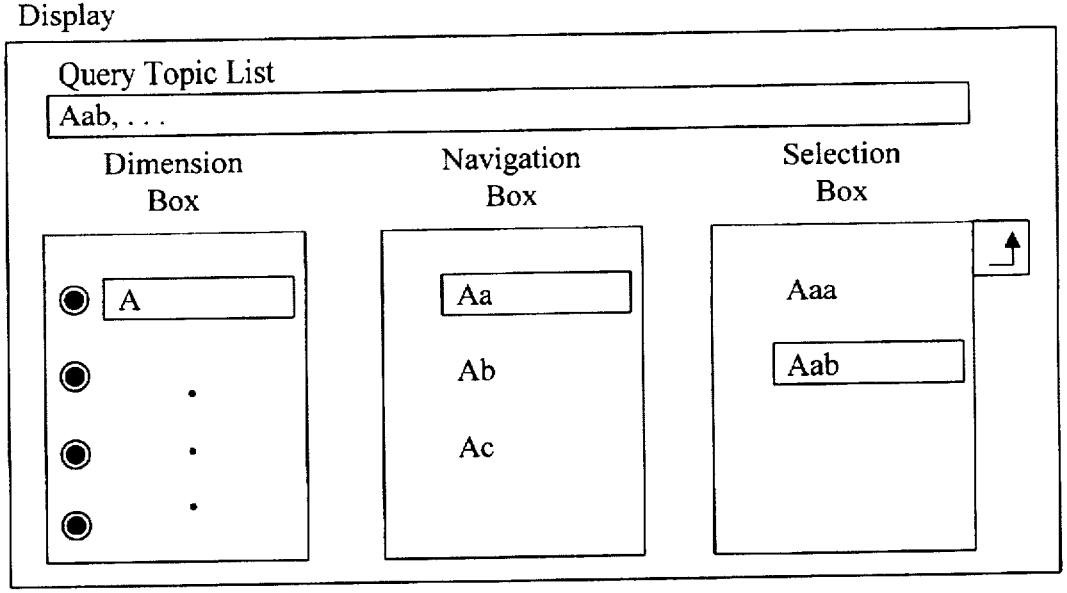
FIG. 12 illustrates example display screens displayed by the select new topic routine.
Figure 12B:
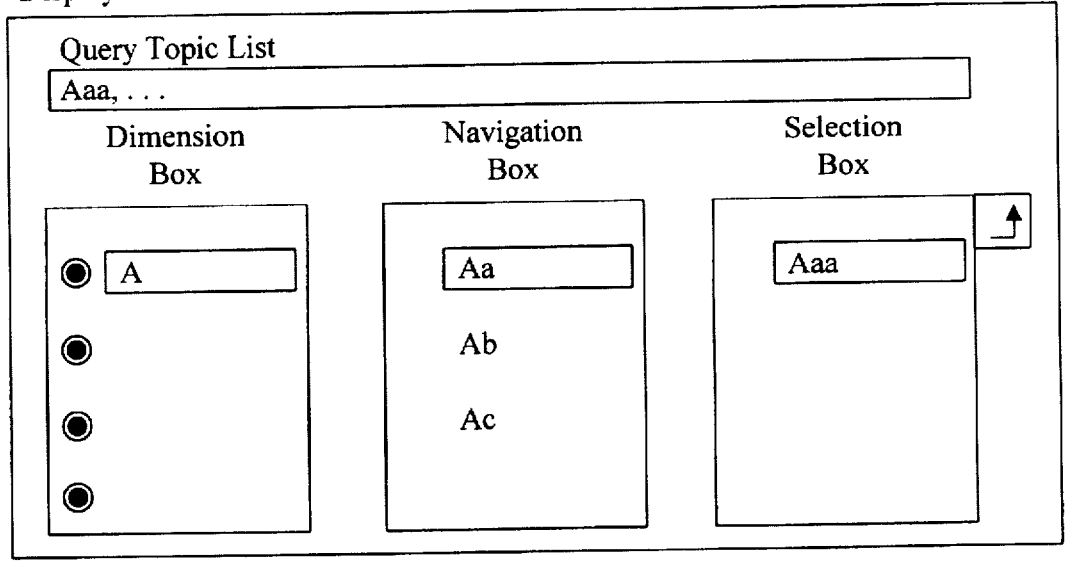

FIG. 12 illustrates example display screens displayed by the Set Topic routine. In FIG. 12, the higher level topic Aa is initially displayed as the currently selected higher level topic in the navigation box. The topic Aab is initially displayed in the selection box as the currently selected topic and is also initially displayed in the query topic list as the currently selected query topic corresponding to Dimension A. Upon user selection of a new topic Aaa from among the topics displayed in the selection box, the set new topic routine displays topic Aaa as the newly selected topic in the selection box. The routine then updates the query topic list so that Aaa replaces Aab as the selected query topic corresponding to Dimension A.

Figure 13:
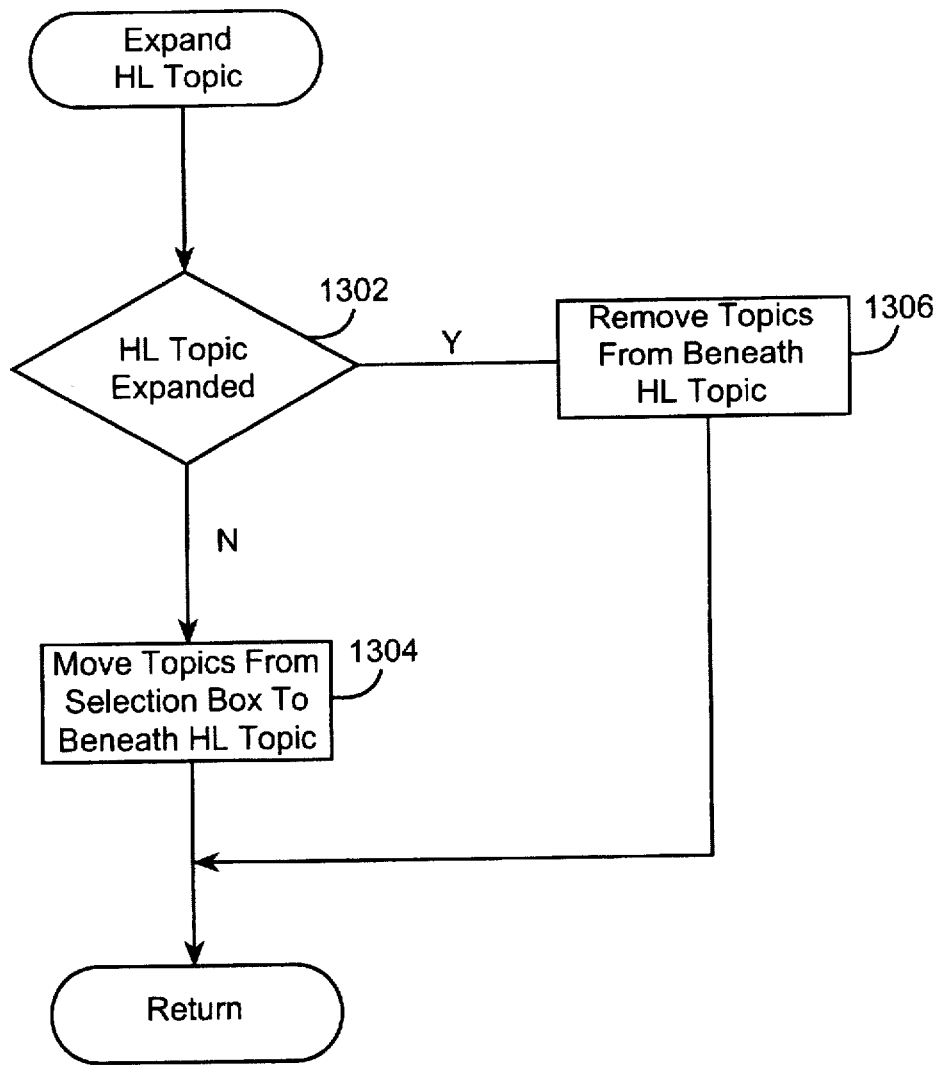
FIG. 13 is a flow diagram of the expand higher level topic routine.

FIG. 13 is a flow diagram of the Expand Higher Level Topic routine. The Expand Higher Level Topic routine expands a higher level topic by displaying in the navigation box the subtopics of the higher level topic under a selected higher level topic. When so requested by the user, the expand higher level topic routine also performs the reverse process of removing displayed subtopics from beneath a higher level topic. The expand higher level topic routine is called by the selection program upon receiving from the user a double click on a higher level topic.

In step 1302, if the higher level topic is not currently expanded, then in step 1304 the routine expands the higher level topic by redisplaying the topics currently displayed in the selection box 216 to a location beneath the higher level topic in the navigation box 214. If, however, in step 1302 the higher level topic is currently expanded, then in step 1306, the routine removes the topics from beneath the higher level topic in the navigation box. The routine then returns to the selection program.

Figure 14A:
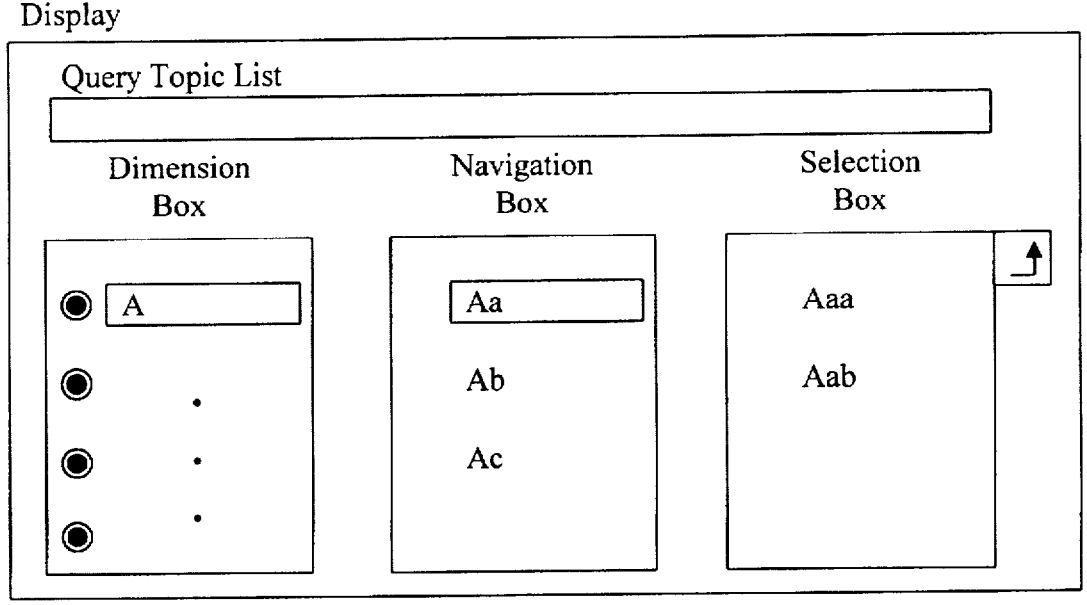
FIG. 14 illustrates example display screens displayed by the expand higher level topic routine.
Figure 14B:
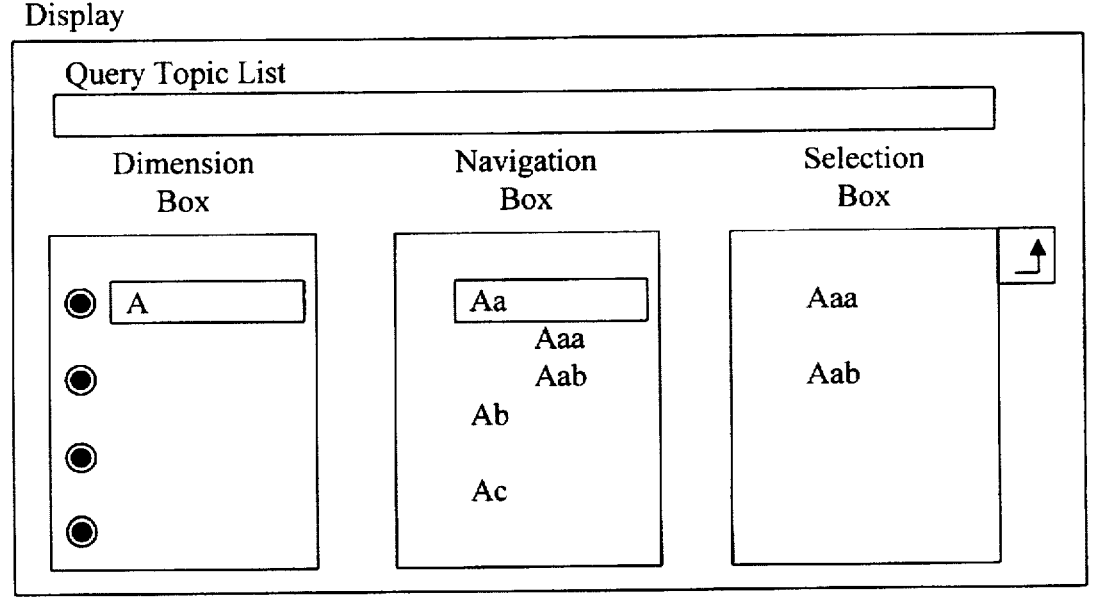

FIG. 14 illustrates example computer screens displayed by the Expand Higher Level Topic routine. Upon a request by the user to expand the higher level topic Aa displayed in the navigation box, subtopics Aaa and Aab are displayed beneath the higher level topic Aa in the navigation box.

Figure 15:
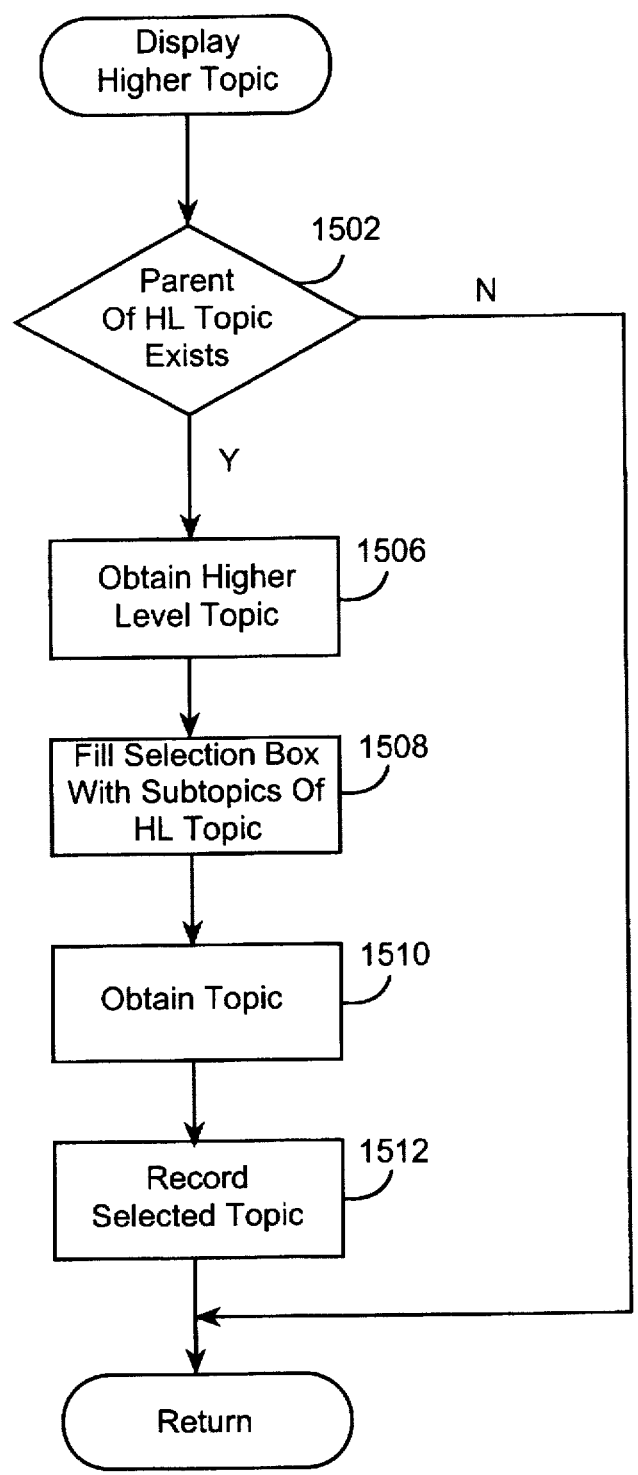
FIG. 15 is a flow diagram of the display higher topic routine.

FIG. 15 is a flow diagram of the Display Higher Level Topic routine. The Display Higher Level Topics routine displays higher level topics than those currently displayed in the navigation box and selection box. The routine replaces the topics currently displayed in the selection box 216 with the higher level topics displayed in the navigation box 214, and replaces the higher level topics currently displayed in the navigation box 214 with higher topics composed of a parent of the higher level topics and its siblings. This routine is called by the selection program upon receiving from the user a double click on a higher level topic displayed in the navigation box or on the arrow 219.

In step 1502, if no parent of the chosen higher level topic exists, then the routine immediately returns to the selection program. If, however, the higher level topic has an existing parent, then control proceeds to step 1506. In step 1506, the routine obtains from the user a selected higher level topic. In step 1508, the routine lists the subtopics of the selected higher level topic in the selection box 216. In step 1510, the routine obtains from the user or selects by default a selected topic. In step 1512, the routine records and displays the selected topic as a query topic in the query topic list 218. The routine then returns to the selection program.

Figure 16A:
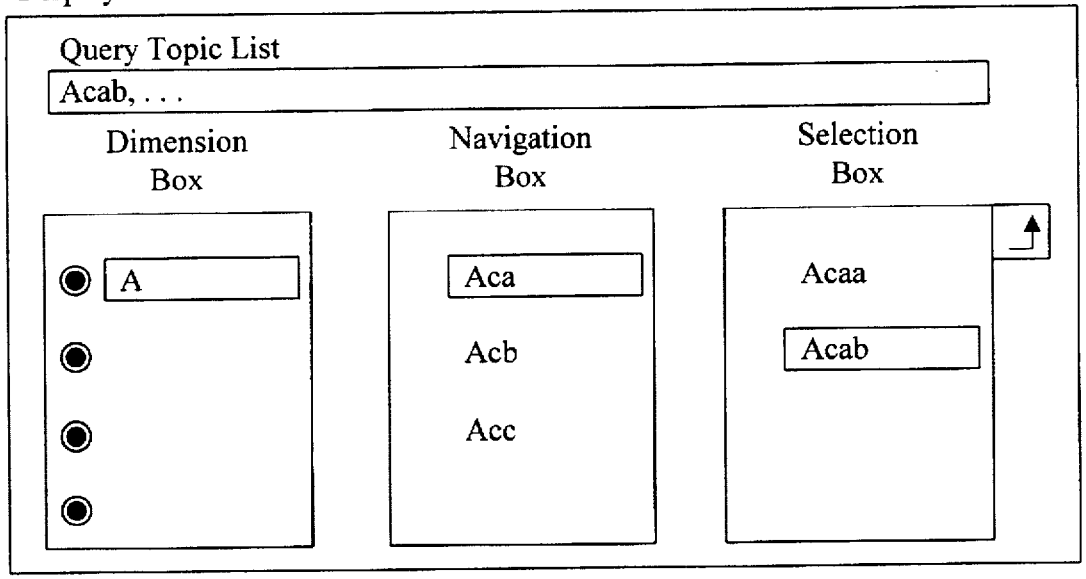
FIG. 16 illustrates example display screens displayed by the display higher topic routine.
Figure 16B:
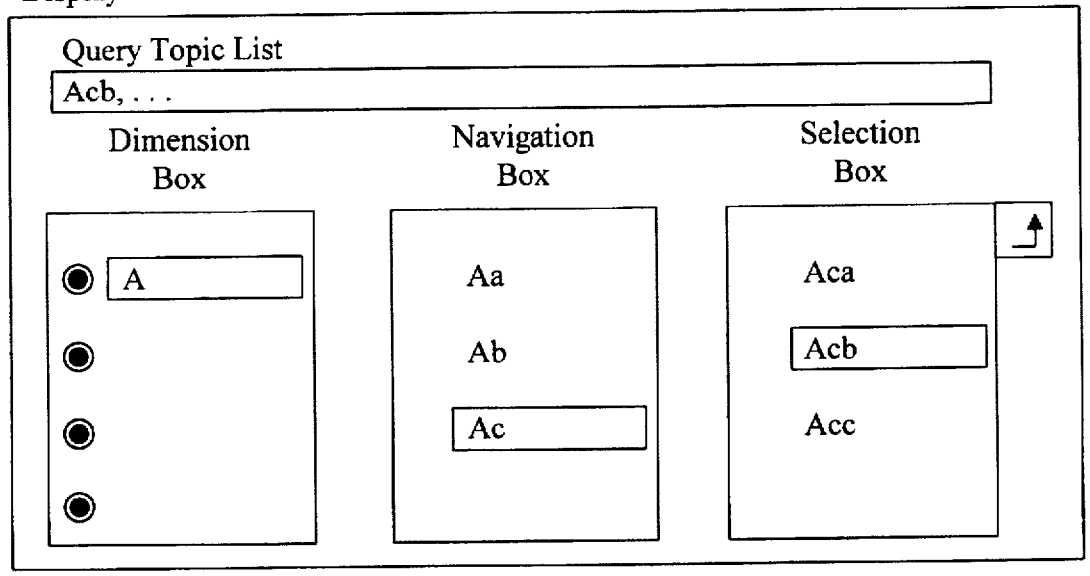

FIG. 16 illustrates example display screens displayed by the Display Higher Level Topic routine. In FIG. 16, the higher level topic Aca is initially displayed as the currently selected topic in the navigation box 214 and the topic Acab is initially displayed as the currently selected topic in the selection box 216 and represented as a query topic in the query topic list. Upon user request of a higher topic that is a parent of the higher level topic Aca, Ac is displayed in the navigation box and the subtopics Aca, Acb and Acc are displayed in the selection box 216. Upon user selection of the topic Acb, the topic Acb is displayed as a query topic in the query topic list.

Figure 17:
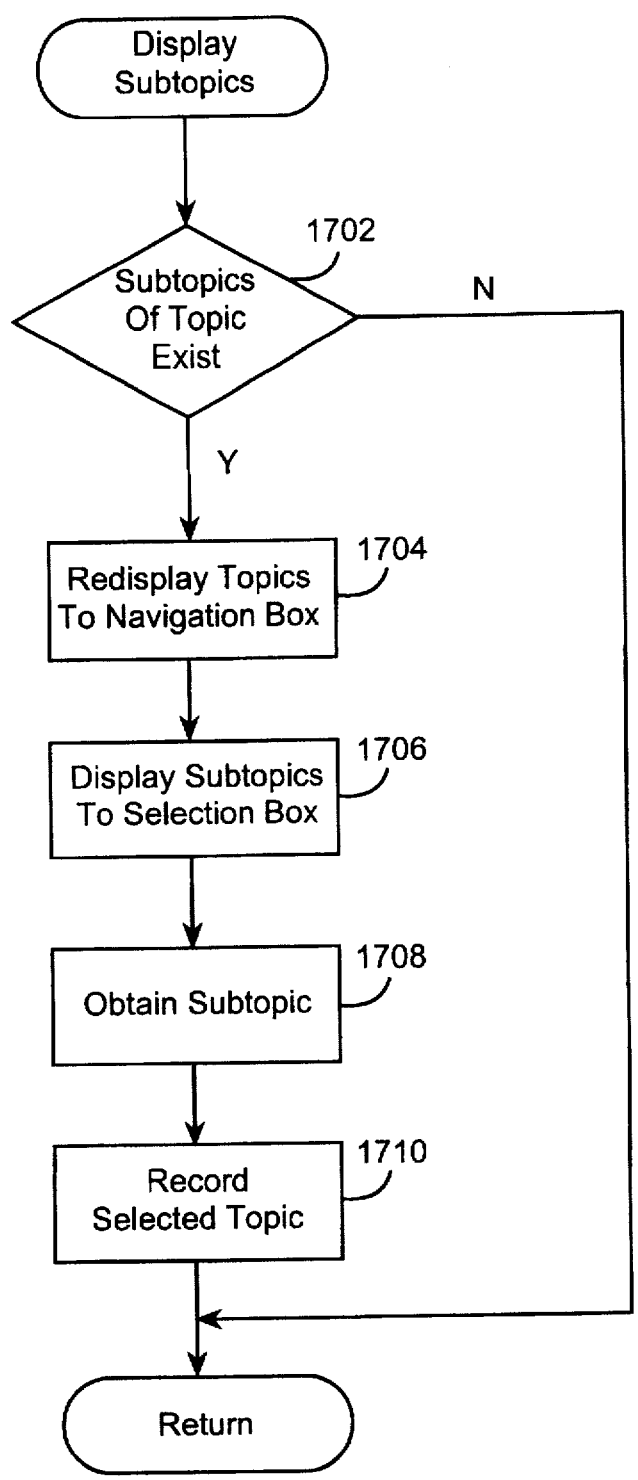
FIG. 17 is a flow diagram of the display subtopic routine.

FIG. 17 is a flow diagram of the Display Subtopics routine. The Display Subtopics routine displays in the selection box subtopics of a topic currently displayed in the selection box 216. The routine replaces the topics currently displayed in the selection box with the subtopics of the chosen topic, and replaces the higher level topics currently displayed in the navigation box 214 with the currently displayed topics. This routine is called by the selection program upon receiving from the user a double click on a topic displayed in the selection box 216.

In step 1702, if no subtopics of the chosen topic exist, then the routine immediately returns to the selection program. If, however, subtopics of the chosen topic exist, the control proceeds to step 1704. In step 1704, the routine redisplays in the navigation box 214 the topics currently displayed in the selection box 216. In step 1706, the routine displays the subtopics of the chosen topic in the selection box 216. In step 1708, the routine obtains by default or from the user a selected topic from the newly displayed topics. In step 1710, the routine records and displays the newly selected topic as a query topic in the query topic list. The routine then returns to the selection program.

Figure 18A:
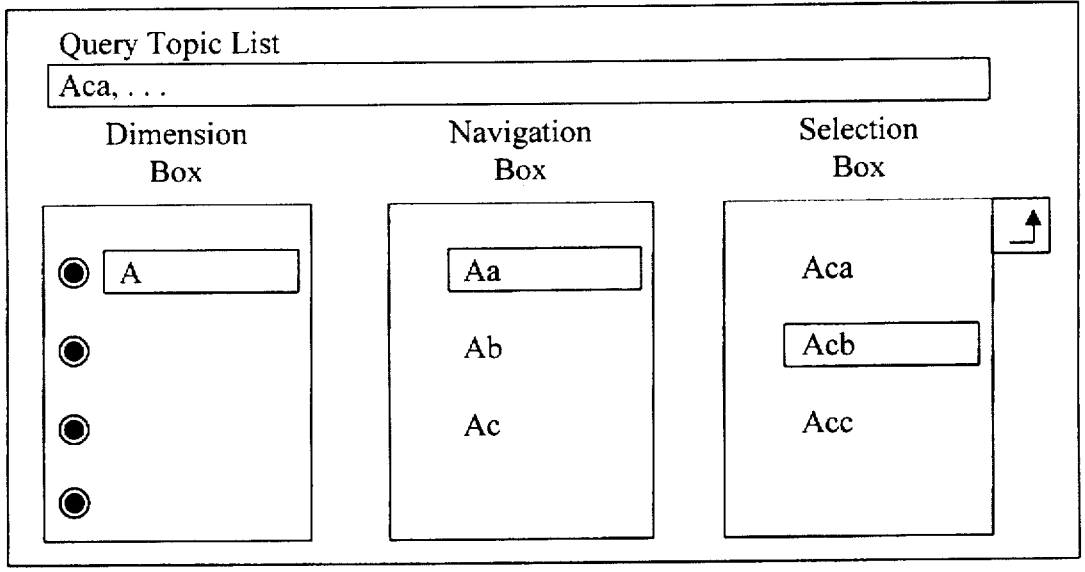
FIG. 18 illustrates example display screens displayed by the display subtopic routine.
Figure 18B:
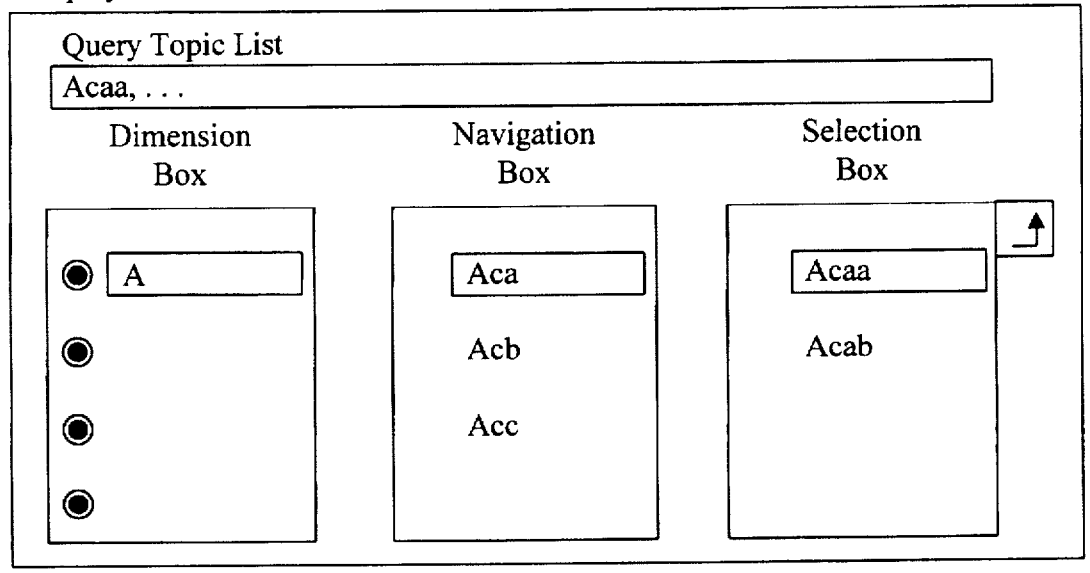

FIG. 18 illustrates example display screens displayed by the display subtopic routine. In FIG. 18, the higher level topic Ac is initially displayed in the navigation box and the topic Aca is initially displayed in the selection 216 box. Upon user request of a subtopic of a currently displayed topic Aca, the topic Aca is redisplayed as a higher level topic in the navigation box, and the subtopics Acaa and Acab of the topic Aca are displayed in the selection box 216. Upon user selection of Acaa from among the displayed topics, the display subtopic routine records and displays the selected topic Acaa as a query topic in the query topic list.

Figure 19:
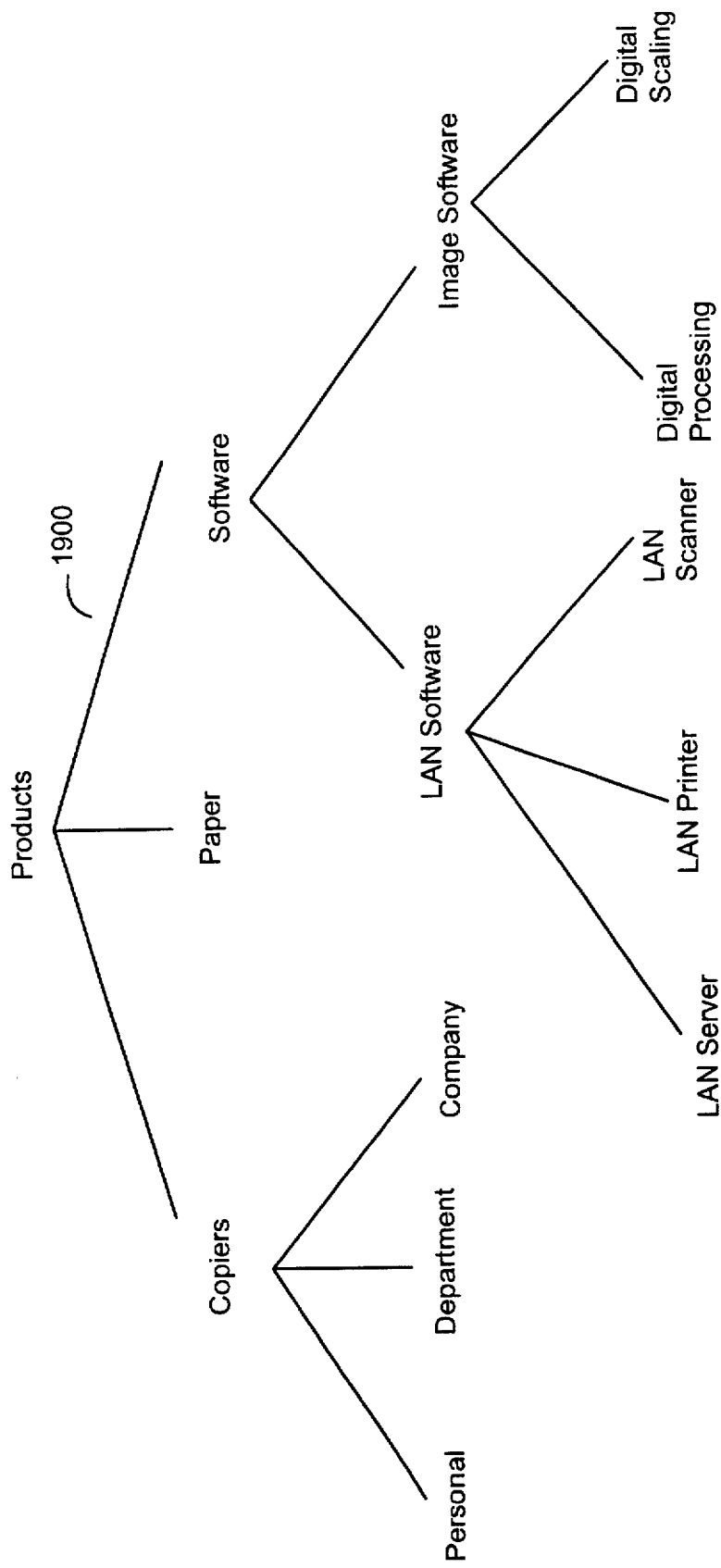
FIG. 19 is an illustration of an example tree data structure.
Figure 20A:
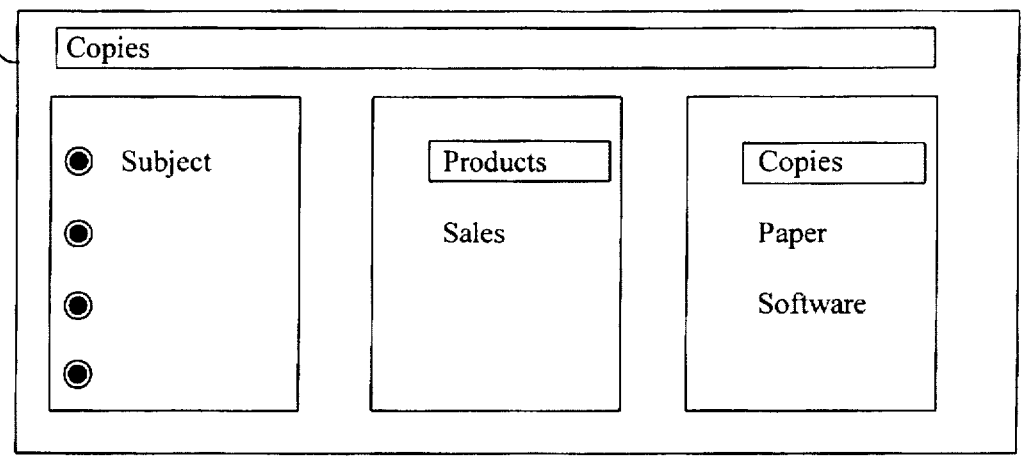
FIG. 20 is an illustration of the operation of the preferred embodiment with reference to example display screens displaying the topics in the example data tree structure shown in FIG. 19.
Figure 20B:
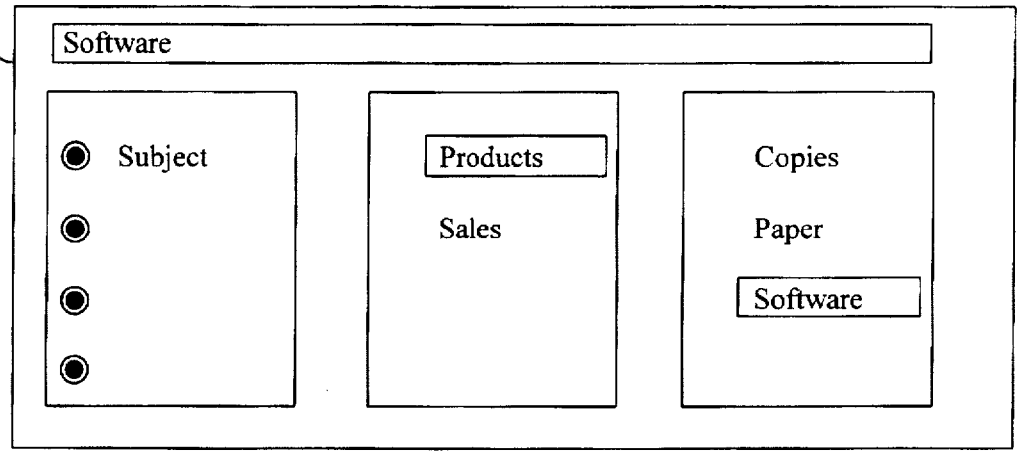
Figure 20C:
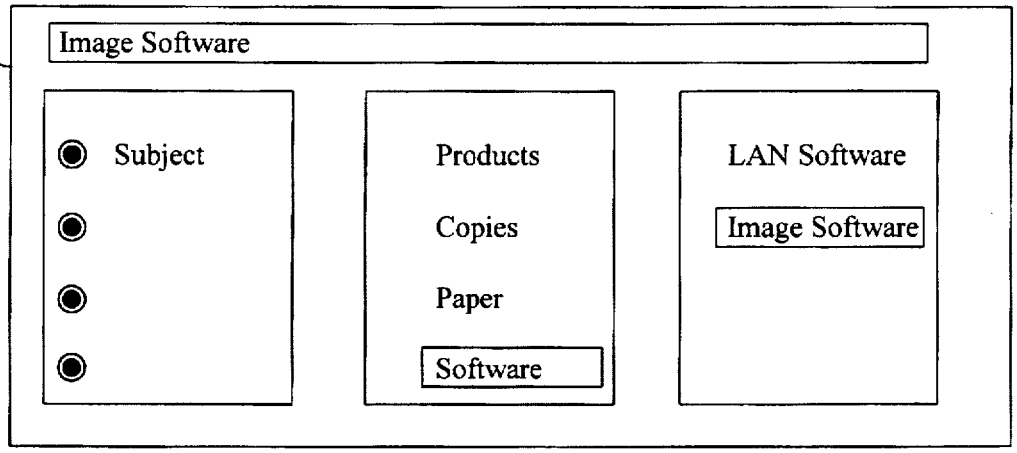

FIGS. 19 and 20 are illustrations of the operation of the preferred embodiment. FIG. 19 shows an example tree structure 1900. FIG. 20 shows example computer screens 2010, 2020, 2030 displaying the topics referenced by the tree structure 2040. The example topics in FIGS. 19 and 20 correspond to the topics used on example of the operation of a prior art system as shown in FIG. 1. Unlike the prior art system, however, which requires a multitude of list boxes to be displayed on the screen, the present invention provides user selection of these example topics at any hierarchical level from a single content variable list.

For example, as shown in computer screen 2010, the query topic list initially includes "Copiers" as query topics selected for the subject dimension from among the higher level topics "Sales" and "Products", respectively (the "Copiers" query topic having last been selected). If the user desires information regarding software net sales instead of copier net sales, the user can change the query topic from "copiers" to "software" by selecting "software" from among the topics displayed in the selection box 216. As a result, the selected topic "software" becomes a query topic in the query topic list, as shown in computer screen 2020.

After selecting "software" as a query topic, if the user desires information on the net sales of a more specific type of software, such as "Image Software," the user can choose to narrow the "software" topic such that its subtopics "LAN Software" and "Image Software" are displayed in the selection box 216. The user can then select "Image Software" from among the topics displayed in the selection box 216. As a result, the selected topic "Image Software" becomes a query topic in the query topic list, as shown in computer screen 2030. At this point, if the user desires to obtain information from the database regarding the net sales of image software, the user requests a database query. The present invention the performs other database query, having "Net Sales" and "Image Software" as query topics, to obtain the desired information.

The inventive method and system has been described with reference to a database system including a database organized in the form of a tree data structure. It will be understood, however, that the underlying concept of the present invention can be applied to any form of hierarchically related information. Further, although in a preferred embodiment a navigation box is provided which displays higher level topics that the user can use as an aid in selecting topics from the selection box, the navigation box is an optional feature which supplements the underlying concept of the invention in which the user is provided with the ability to select topics from a single content-variable list. Similarly, the feature of selecting different query topics corresponding to different query dimensions for a multiple-topic database query is an enhancement of this underlying concept. Also, although the content-variable list has been described as a selection box from which a user selects topics by positioning the cursor thereon with the use of a mouse, one of ordinary skill will readily appreciate many forms in which the content-variable list can be implemented and many forms of selection of topics therefrom. Yet other variations of the present invention will also be readily apparent to one skilled in the art.

I claim:

1. In a computer system having a display device and hierarchical database that is indexed by dimensions, topics, and sub-topics, a method of displaying a query user interface on the display device for the hierarchical database, comprising the computer-implemented steps of:

displaying a list of dimensions in a first element of the query user interface, said list of dimensions containing dimensions that are selectable by a user wherein a selected one of the dimensions in the list of dimensions is currently selected and each dimension corresponds to a set of topics in the hierarchical database;

displaying a list of higher-level topics in a second element of the query user interface, wherein said list of higher-level topics holds a list of higher-level topics that are contained in the topics of the selected dimension, wherein the higher-level topics are selectable by a user and wherein a selected one of the higher-level topics is currently selected; and displaying a list of lower-level topics in a third element of the query user interface element, wherein said list of lower-level topics holds a list of lower-level topics that are sub-topics for the selected higher-level topic, wherein said sub-topics are selectable by the user to select a topic for a query of the hierarchical database;

wherein the first element, the second element and the third element are concurrently displayed as part of the query user interface;

wherein when a user selects a different dimension from the list of dimensions displayed in the first element, displaying in the second element a list of higher-level topics that are contained in the topics of the selected different dimension and displaying in the third element a list of lower-level topics that are contained in a selected higher-level topic that is displayed in the second element; and wherein when a user selects a different higher-level topic from the list of higher-level topics displayed in the second element, displaying in the third element a list of lower-level topics that are contained in the selected higher-level topic that is displayed in the second element.

2. The method of claim 1, further comprising the step of changing the higher level topics displayed in the list of higher level topics in response to a user selecting a different dimension in the list of dimensions from the dimension that is currently selected.

3. The method of claim 2, further comprising the step of changing the lower level topics displayed in the list of lower level topics in response to the user selecting a different higher level topic than the higher level topic that is currently selected in the list of higher level topics.

4. The method of claim 1, further comprising the step of changing the lower level topics displayed in the list of lower level topics in response to the user selecting a different higher level topics than the higher level topics that is currently selected in the list of higher level topics.

5. The method of claim 1 wherein the second element of the query user interface is a list box.

6. The method of claim 1 wherein the third element of the query user interface is a list box.

7. A method in a computer system for browsing through topics within a hierarchy of topics, the method comprising:

providing a plurality of dimensions, each dimension representing a hierarchy of topics, each dimension having a root topic and having leaf topics, each topic other than the root topic having a higher-level topic and each topic other than the leaf topics having a lower-level topic;

displaying in a dimension box an indication of the root topic of each of the provided dimensions;

receiving from a user a selection of one of the displayed dimensions;

in response to receiving the selection of one of the displayed dimensions, displaying in a navigation box the next lower-level topics of the root topic of the selected dimension;

receiving from the user a selection of one of the topics displayed in the navigation box;

in response to receiving the selection of one of the topics displayed in the navigation box, displaying in a selection box the next lower-level topics of the topic selected from the navigation box;

receiving from the user a selection of one of the topics displayed in the selection box; and in response to receiving the selection of one of the topics displayed in the selection box, displaying in the navigation box the topics currently displayed in the selection box and displaying in the selection box the next lower-level topics of the topic selected from the selection box whereby the dimension, navigation, and selection boxes are displayed simultaneously.

8. The method of claim 7 including receiving from the user an indication to display the next higher-level topics; and in response to receiving the indication to display the next higher-level topics, displaying in the selection box the topics currently displayed in the navigation box and displaying in the navigation box the next higher-level topics of the topics currently displayed in the navigation box.

9. The method of claim 7 including receiving from the user an indication to expand the topics currently displayed in the navigation box; and in response to receiving the indication to expand the topics currently displayed in the navigation box, displaying simultaneously within the navigation box each topic that is currently displayed along with displaying the next lower-level topics of a currently displayed topic.

10. The method of claim 7 including receiving from the user an indication to contract the topics currently displayed in the navigation box; and in response to receiving the indication to contract the topics currently displayed in the navigation box, displaying within the navigation box each topic that is currently displayed without displaying within the navigation box the next lower-level topics.

11. The method of claim 7 including in response to receiving the selection of one of the topics displayed in the selection box, displaying in a query topic list the selected topic so the query topic list contains a selected topic for various dimensions.

12. The method of claim 7 including receiving from the user a selection of another of the displayed dimensions; and in response to receiving the selection of the other of the displayed dimensions, displaying in a navigation box the next lower-level topic of the root topic of the selected other dimension.

13. A computer-readable medium containing instruction for controlling a computer system to browse through topics within a hierarchy of topics, by receiving from a user a selection of one of a plurality of dimensions, each dimension representing a hierarchy of topics, each dimension having a root topic and having leaf topics, each topic other than the root topic having a higher-level topic and each topic other than the leaf topics having a lower-level topic;

in response to receiving the selection of one of the plurality of dimensions, displaying in a navigation box the topics of the next lower-level topic of the root topic of the selected dimension;

receiving from the user a selection of one of the topics displayed in the navigation box;

in response to receiving the selection of one of the topics displayed in the navigation box, displaying in a selection box, simultaneously with the displaying of the navigation box, the next lower-level topics of the topic selected from the navigation box;

receiving from the user a selection of one of the topics displayed in the selection box; and in response to receiving the selection of one of the topics displayed in the selection box, displaying in the navigation box the topics currently displayed in the selection box and displaying in the selection box, simultaneously with the displaying of the navigation box, the next lower-level topics of the topic selected from the selection box.

14. The computer-readable medium of claim 13 including receiving from the user an indication to display the next higher-level topics; and in response to receiving the indication to display the next higher-level topics, displaying in the selection box the topics currently displayed in the navigation box and displaying in the navigation box the next higher-level topics of the topics currently displayed in the navigation box.

15. The computer-readable medium of claim 13 including receiving from the user an indication to expand the topics currently displayed in the navigation box; and in response to receiving the indication to expand the topics currently displayed in the navigation box, displaying simultaneously within the navigation box each topic that is currently displayed along with displaying the next lower-level topics of a currently displayed topic.

16. The computer-readable medium of claim 13 including receiving from the user an indication to contract the topics currently displayed in the navigation box; and in response to receiving the indication to contract the topics currently displayed in the navigation box, displaying within the navigation box each topic that is currently displayed without displaying within the navigation box the next lower-level topics.

17. The computer-readable medium of claim 13 including in response to receiving the selection one of the topics displayed in the selection box, displaying in a query topic list the selected topic so the query topic list contains a topic for each dimension that has been selected by the user.

18. A method in a computer system to browsing through topics within a plurality of hierarchy of topics, the method comprising:

selecting one of the plurality of hierarchy of topics, each hierarchy of topics having a root topic;

displaying in a first element lower-level topics of the root topic of the selected hierarchy of topics;

selecting one of the topics displayed in the first element;

displaying in a second element, simultaneously with the displaying of the first element, lower-level topics of the topic selected from the first element;

selecting one of the topics displayed in the second element; and displaying in the first element the topics currently displayed in the second element and displaying in the second element, simultaneously with the displaying of the first element, lower-level topics of the topic selected from the second element.

19. The method of claim 18 including receiving an indication to display higher-level topics; and in response to receiving the indication to display the higher-level topics, displaying in the second element the topics currently displayed in the first element and displaying in the first element higher-level topics of the topics currently displayed in the first element.

20. The method of claim 18 including receiving an indication to expand the topics currently displayed in the first element; and in response to receiving the indication to expand the topics currently displayed in the first element, displaying simultaneously within the first element each topic that is currently displayed along with displaying lower-level topics of a currently displayed topic.

21. The method of claim 18 including receiving an indication to contract the topics currently displayed in the first element; and in response to receiving the indication to contract the topics currently displayed in the first element, displaying within the first element each topic that is currently displayed without displaying within the first element lower-level topics.

22. The method of claim 18 including in response to selecting one of the topics displayed in the second element, displaying in a query topic list the selected topic so the query topic list contains a selected topic for multiple dimensions.

23. The method of claim 18 including selecting another of the hierarchy of topics; and displaying in the first element lower-level topics of the root topic of the selected other hierarchy of topics.

* * * * *